US009436836B2

(12) United States Patent
Graf

(10) Patent No.: US 9,436,836 B2
(45) Date of Patent: Sep. 6, 2016

(54) TAMPERPROOF REGULATION OF A PROCESS, PRODUCTION, AND ACTUATING INSTALLATION

(71) Applicant: Siemens Aktiengesellschaft, Munich (DE)

(72) Inventor: Rene Graf, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 161 days.

(21) Appl. No.: 14/247,458

(22) Filed: Apr. 8, 2014

(65) Prior Publication Data
US 2014/0304521 A1 Oct. 9, 2014

(30) Foreign Application Priority Data
Apr. 9, 2013 (EP) .................................. 13162911

(51) Int. Cl.
*G06F 11/30* (2006.01)
*G06F 12/14* (2006.01)
*G06F 21/60* (2013.01)
*G05B 19/418* (2006.01)
*H04L 9/00* (2006.01)
*G06F 15/16* (2006.01)

(52) U.S. Cl.
CPC ......... *G06F 21/602* (2013.01); *G05B 19/4185* (2013.01); *H04L 9/008* (2013.01); *G05B 2219/25205* (2013.01); *Y02P 90/18* (2015.11)

(58) Field of Classification Search
CPC . G06F 21/72; G06F 21/10; G06F 2221/2107
USPC ............... 713/168–174, 182–186, 189, 202; 709/206, 225, 229, 249, 389; 726/2–8
See application file for complete search history.

(56) References Cited

U.S. PATENT DOCUMENTS

| 7,151,966 B1 | 12/2006 | Baier et al. |
| 7,711,818 B2 * | 5/2010 | Lee .......................... G06F 21/41 705/30 |
| 2006/0277413 A1 * | 12/2006 | Drews ................. G06F 21/6218 713/189 |
| 2010/0256794 A1 | 10/2010 | McLaughlin et al. |
| 2011/0211692 A1 | 9/2011 | Raykova et al. |
| 2011/0264920 A1 | 10/2011 | Rieffel et al. |

OTHER PUBLICATIONS

Simonite Tom et al; "Mehr Sieberheit für Datenwolken"; Technology Review, Gefunden Im Internet: URL:http://www.heise.da/tr/arikel/Mehr-Sicherhelt-fuer-Datenwolken-1324650.html; pp. 1-2; XP055079832; 2011; Aug. 18, 2011.

* cited by examiner

*Primary Examiner* — Evans Desrosiers
(74) *Attorney, Agent, or Firm* — Cozen O'Connor

(57) ABSTRACT

A method for regulating process, production, and/or actuating installation includes recording observation data records at installation components of the installation by respective recording units of the installation. The method also includes transmitting the observation data records to a central control apparatus of the installation via a field bus. The method further includes forming, at the control apparatus, associated actuating data record based on the transmitted observation data records. The method also includes transmitting the actuating data records to actuating units of the installation via filed buses. The method also includes adjusting the installation components from the actuating units based on the transmitted actuating data records. The observation data records are encrypted at the respective recording units before transmitted to the control apparatus The actuating data records are formed from the encrypted observation data records without decrypting the encrypted observation data records during the process of forming the actuating data records.

7 Claims, 1 Drawing Sheet

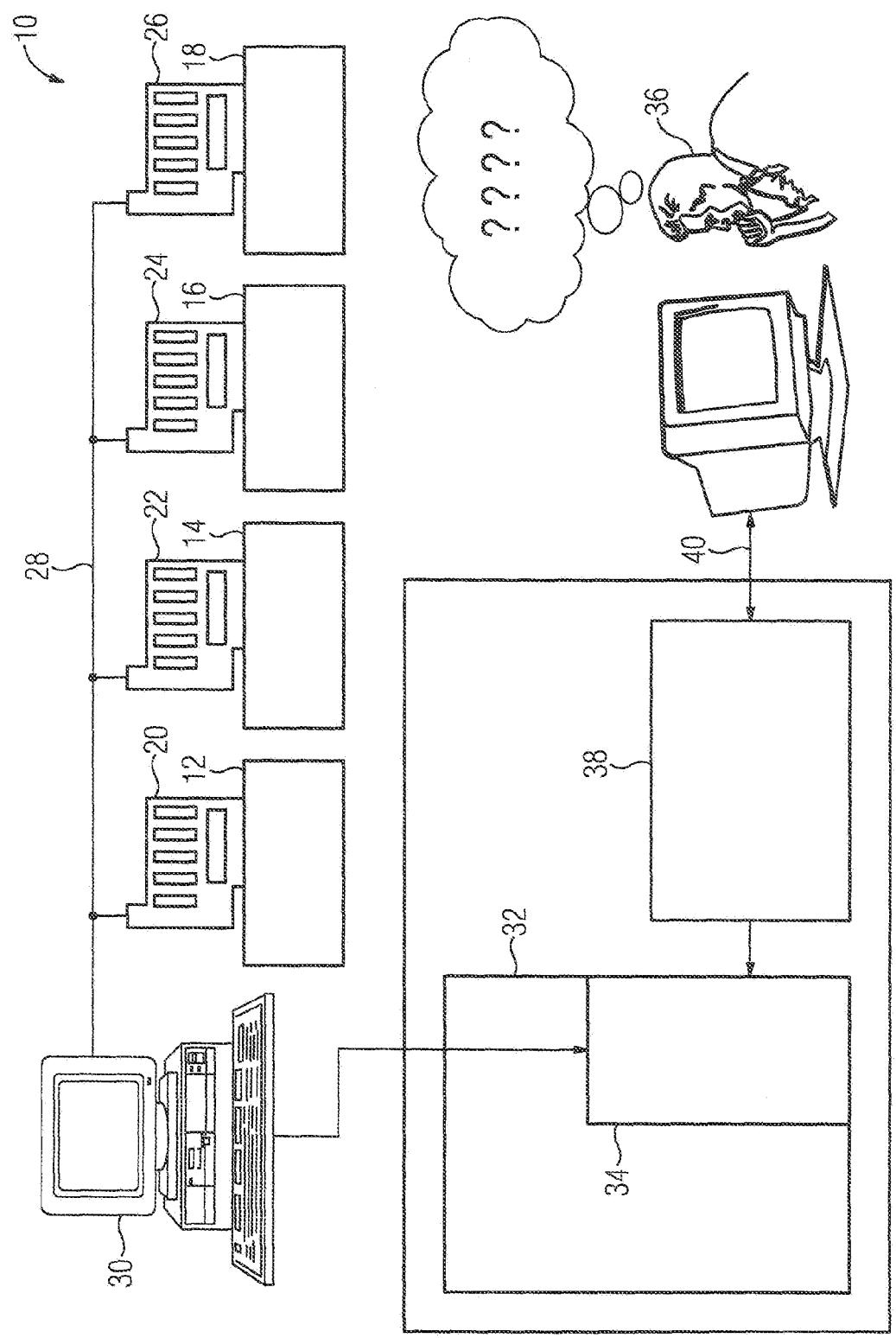

TAMPERPROOF REGULATION OF A PROCESS, PRODUCTION, AND ACTUATING INSTALLATION

FIELD OF THE INVENTION

The invention relates to a method for regulating a process and/or production installation ("installation"). Specifically, the invention is related to a recording and actuating apparatus for an installation component of the installation and a central control apparatus for regulating a plurality of installation components via a field bus, as well as a computer program product and a method for improving a conventional installation.

DESCRIPTION OF THE RELATED ART

Controllers, which interchange analog and digital signals with individual installation components to be controlled in the installation via additional assembly or assemblies, are used in automation technology. The additional assembly reads observation data relating to the installation component associated with it (e.g., sensor signals or state parameters), and then drives an actuator of the installation component in accordance with a predefined regulation algorithm using actuating signals. Such an additional assembly is referred to below as a recording arid actuating apparatus. Such recording and actuating apparatuses are locally arranged on the individual installation components. In the case of small installations or machines, a signal processing unit may also be directly arranged to calculate the appropriate actuating data for generating the actuating signals from the observation data.

In contrast, in the case of larger installations, although the additional assemblies are generally still locally arranged on the installation components for signal conversion and are therefore distributed in the installation, their observation data are transmitted, via a so-called field bus, for example a Profibus, to a central control apparatus in which associated data records containing actuating data are determined from the individual, cyclically transmitted data records comprising observation data from the recording and actuating apparatuses (observation data records) in accordance with a predetermined regulation algorithm. The actuating data records are then transmitted, via the field bus, to the individual recording and actuating apparatuses, which then again generate the actuating signals in the described manner.

Ethernet which is known from the office world is also increasingly being used as the basic technology or for the physical layer for implementing a field bus. In order to implement the central control apparatus, what is frequently relied on is a solution based on standard technology, such as conventional personal computers (PCs) having an operating system which executes not only the actual regulation program for the regulation algorithm but also user programs. Such installation controllers based on standard technologies are accordingly also susceptible to eavesdropping or tampering by third parties e.g., if malware gains access to the observation data, the regulation program or the actuating data on a central control apparatus. On account of the use of Ethernet as the field bus basis, physical access to the installation network may also be easily possible.

Effective protection against eavesdropping and tampering must be provided, in particular, in safety-critical installations, such as a power plant or an energy supply network for a city or a signaling installation (traffic, railroad), for example. Whereas it is known practice from the office world to protect data transmission via Ethernet using encryption, this cannot be directly implemented in the time-critical applications of installation regulation. This is because the input data records would then first of all have to be decrypted in the central control apparatus and the large amount of output data, that is to say the actuating data records, would subsequently have to be encrypted again before transmission. This costs computing time which often exceeds the performance of the available processors, in particular in real-time applications of installation regulation. This is because the computing power is limited in proprietary controllers, not least for reasons of cost.

In addition, this protection is not sufficient in the so-called soft controllers which are increasingly being used more and more and run as a regulation program on normal PCs and sometimes also on conventional PC operating systems. Even if transmission via Ethernet is carried out in encrypted form, there are nevertheless completely new weak points for tampering with the regulation data, that is to say the observation and actuating data, inside the control apparatus since malware smuggled in via the PC operating system can directly eavesdrop and tamper with the data relating to the soft controller without this being noticed since the malware can directly access the main memory, for example, and need not be coupled to the regulation program for the installation through communication.

In future, the problem of data security in installation regulation will become even greater since the computing power will be found less in the installation itself according to a current trend but rather in a separate computing center for this installation, and the separate computing center can also be implemented, for example, as a programmable logic controller (PLC) based computer network which will be structured in a similar manner to the cloud computing known from the office world.

SUMMARY OF THE INVENTION

The invention is based on an object of protecting installation regulation with recording and actuating apparatuses locally arranged on the installation components, on one hand, and a central control apparatus, on the other hand, against tampering with the regulation data, that is to say the observation data and the associated actuating data.

In one embodiment, a method according to the invention regulates a process and/or production and/or actuating installation, such as a bottle filling installation or a power plant or a signal actuating installation, for example. At least one observation data record is respectively recorded at at least one installation component of the installation, such as a conveyor belt, a filling robot or a controllable valve, for example, by a respective recording unit of the installation. An observation data record includes observation data, such as measurement data or state parameter values, which describe a current state of the installation component. Each observation data record is transmitted to a central control apparatus of the installation via a field bus. Ethernet or a Profibus can be provided as the field bus, for example. The central control apparatus forms at least one associated actuating data record, that is to say a data record containing actuating data for generating actuating signals for actuators of installation components, on the basis of at least one transmitted observation data record which has been received by the control apparatus. The at least one actuating data record is then respectively transmitted to at least one actuating unit of the installation via the field bus, which actuating unit then respectively adjusts at least one installation component of the installation on the basis of the transmitted actuating data record. The actuating unit can do this by generating corresponding actuating signals from the actuating data, wherein the actuating signals then influence corresponding actuators.

In order to now achieve protection against eavesdropping or even tampering in this installation structure, the respective observation data record to be transmitted is encrypted in each recording unit in the method according to the invention and is transmitted in the encrypted state. Unlike in the prior art, however, this does not provide additional computing complexity in the control apparatus. This is because each actuating data record is directly formed from the at least one encrypted observation data record in the central control apparatus, that is to say without previously decrypting the observation data record for this purpose. An encrypted actuating data record is thus immediately and directly determined from encrypted observation data and is then transmitted to the at least one actuating unit via the field bus. The respective encrypted actuating data record which has been received via the field bus is then only decrypted in this actuating unit for the purpose of actuating the associated installation component.

The invention has an advantage that no additional calculation effort for decrypting the observation data and for encrypting the actuating data again arises in the central control apparatus. Another great advantage is that only encrypted regulation data (observation data and actuating data) are present inside the central control apparatus, with the result that malware cannot interpret or tamper with the regulation data in a deliberate manner or unnoticed if it has access to the memory area for the regulation data.

The essence of the invention is therefore the use of particular encryption methods, with the result that the regulation data do not have to be decrypted in the central controller in order to be processed. A useful encryption method can naturally only be found in this case in connection with the regulation algorithms used.

One method, which does not necessarily result in the first-mentioned advantage of the low computing load, involves the recording unit transmitting not only the true, actual observation data but additionally a further partial data record containing false observation data with a respective observation data record. In this case, only the recording unit and the associated actuating unit then know which part(s) of the observation data contained in the observation data record arc the true data. The position of the true observation data inside an observation data record can be varied, for example, using a random function. If such an observation data record which has been expanded with false observation data is now transmitted to the central control apparatus, the latter can calculate actuating data associated with all observation data (the true and false data) and can then combine said actuating data in an actuating data record and can transmit them to the actuating unit. It is then known again in the actuating unit which part(s) of the actuating data are actually suitable for actuating the installation component. In contrast, eavesdropping of such regulation data which have been expanded with false data does not allow an observer or a tampering program to draw a conclusion on the actual state of the installation.

However, this form of encryption is based only on concealing the true regulation data. In order to encrypt at least one of the observation data records to be transmitted, another embodiment of the method provides for a bit pattern to be impressed on said observation data record using a bit operation. The actuating unit then removes the hit pattern again using an inverse hit operation in order to decrypt the associated encrypted actuating data record. This development can be used for actuating data, in the case of which the central control apparatus carries out simple data links of the observation data which can therefore also be combined more easily with these methods than complex calculations, for example. One example of such a reversible bit operation for bit patterns is the XOR operation.

In order to encrypt at least one of the observation data records to be transmitted, another embodiment of the method provides for the observation data in the observation data record to be transformed by using a linear or affine transformation and, in order to decrypt each associated encrypted actuating data record, for the latter to then be transformed using an inverse transformation corresponding to the transformation. A simple example illustrates the principle: the numbers 5 and 7 are encrypted by doubling them. The new values are 10 and 14 which can then be transmitted to a central control apparatus. If both are added in the control apparatus, 24 is obtained. if the doubling of the starting data (numbers 5 and 7) is now reversed again in the actuating unit, this means that the result (24) must be halved. This results in 12. In contrast, if the starting numbers 5 and 7 are directly added, that is to say without encryption, the sum is likewise 12. The central control apparatus can still use the unchanged regulation algorithm if it involves the addition of the two numbers. The same result emerges after decryption. In this case, the encryption is therefore a multiplication factor which is known only to the recording unit and the actuating unit. In contrast, without knowledge of the multiplication factor, an observer cannot discern which are the correct values.

In order to encrypt at least one of the observation data records to be transmitted (preferably a plurality of observation data records and, in particular, all observation data records), another embodiment of the method, which can be used for many different regulation algorithms, provides for the respective observation data record to be encrypted by the respective recording unit using homomorphic encryption arid for the at least one actuating data record to be formed in the central control unit using a calculation rule adapted to the homomorphic encryption. Homomorphic encryption has previously only been known from the field of data mining. Homomorphic encryption makes it possible to carry out a large number of computing operations on encrypted observation data which then directly result in encrypted actuating data. The latter can be used by an actuating unit to actuate the installation component by virtue of the encrypted actuating data being decrypted in the actuating unit using corresponding decryption for the homomorphic encryption.

However, in this case, the calculation algorithm then needs to be adapted in the central control apparatus. This aspect is generally covered by the central control apparatus according to the invention, that is to say not only in connection with the homomorphic encryption. The central control apparatus according to the invention has a transmission unit, such as a Profinet or Ethernet communication module, and a processing unit, such as a processor system. The transmission unit is designed to receive encrypted observation data records via a field bus and to transmit associated encrypted actuating data records formed therefrom by the processing unit via the field bus again. The processing unit is designed to determine the associated encrypted actuating data records from the encrypted observation data records without previously decrypting the observation data records in the described manner. For this purpose, a regulation algorithm which is farmed from a standard regulation algorithm, i.e., a regulation algorithm which processes unencrypted observation data records to form unencrypted actuating data records, is used in the control apparatus. The regulation algorithm used in the control apparatus according to the invention is adapted to the effect that the encrypted actuating data records calculated by the control apparatus yield, after their decryption, a result which is the same as if the encrypted observation data records had first been decrypted and the decrypted observation data had been processed using the standard regulation algorithm.

The invention also comprises a recording and actuating apparatus, as can be locally arranged on an installation component in order to record observation data and to deliver actuating signals for an actuator of the installation component using actuating data from a central control apparatus. The recording and actuating apparatus according to the invention comprises, in a manner known per se, the recording unit for generating an observation data record, a transmission unit for transmitting the observation data record to a central control apparatus via a field bus and for receiving an associated actuating data record from the central control apparatus via the field bus. An actuating unit delivers at least one actuating signal to an actuator of the installation component on the basis of the actuating data record.

In this case, however, in the recording and actuating apparatus according to the invention, provision is now made in the described manner for the recording unit adapted to encrypt the observation data record before transmission using an encryption method which is unknown to the central control apparatus. If the associated actuating data are then received as an encrypted actuating data record, this actuating data record is decrypted by the actuating unit, before generating the at least one actuating signal, using a decryption method corresponding to the encryption method. It is thus ensured that the regulation data cannot be interpreted or deliberately tampered with by an observer program or malware outside the recording and actuating apparatus.

The invention also includes embodiments of the central control apparatus according to the invention, on one hand, and of the recording and actuating apparatus, on the other hand, which have features that have already been described in connection with the corresponding embodiments of the method according to the invention. For this reason, the corresponding embodiments of the central control apparatus and of the recording and actuating apparatus are not discussed again here.

An installation which is associated with the invention and may be in the form of a process and/or production and/or actuating installation and comprises an embodiment of the central control apparatus according to the invention and at least one embodiment, in particular a plurality of embodiments, of the recording and actuating apparatus according to the invention is likewise claimed separately. In this case, the installation according to the invention is designed to carry out an embodiment of the method according to the invention.

Finally, the invention also includes a computer program product. In the case of the latter, computer programs are stored on at least one storage medium, one of which computer programs is in the form of a central regulation program for a central control apparatus of a process and/or production and/or actuating installation and at least one further one of which computer programs is in the form of an operating program for a recording and actuating apparatus of an installation component, which recording and actuating apparatus is coupled to the central control apparatus via a field bus. According to the invention, the computer programs are adapted in this case to carry out an embodiment of the method according to the invention when executed together by the apparatuses.

BRIEF DESCRIPTION OF THE DRAWINGS

The invention is explained in more detail again below using a specific exemplary embodiment. In this respect, the single FIGURE shows an embodiment of the installation according to the invention.

DETAILED DESCRIPTION OF THE PREFERRED EMBODIMENTS

In the exemplary embodiment explained below, the described components of the embodiment and the described steps of the method each represent individual features of the invention which should be considered independently of one another and each also develop the invention independently of one another and therefore can also be considered to be part of the invention individually or in a combination other than that shown. Furthermore, the described embodiments can also be supplemented with further features of the features of the invention which have already been described.

The FIGURE shows a process and or production and/or actuating installation, or installation 10 for short, in which individual installation components 12, 14, 16, 18 are observed and controlled by additional assemblies or recording and actuating apparatuses, apparatuses 20, 22, 24, 26 for short. In this case, each of the apparatuses 20, 22, 24, 26 can be arranged on the respective installation component 12, 14, 16, 18 associated with it or in the vicinity of the component. On the one hand, the apparatuses record observation data, for example sensor signals or state parameters, and, on the other hand, generate actuating signals for actuating actuators of the respective installation component 12, 14, 16, 18. For this purpose, each of the apparatuses 20, 22, 24, 26 has a respective recording unit and actuating unit (not illustrated in any more detail) which may be provided, for example, as program modules in a program of a programmable logic controller.

Each of the apparatuses 20, 22, 24, 26 is connected, using a transmission unit (not illustrated in any more detail), for example a bus communication module, to a central control apparatus 30, for example a workstation or a personal computer, via a field bus 28. The central control apparatus 30 carries out a regulation algorithm which receives, as input data, the observation data from the apparatuses 20, 22, 24, 26 in the form of respective observation data records transmitted at predetermined times and uses said data to generate actuating data which are transmitted again, as actuating data records, to the respective apparatuses 20, 22, 24, 26 via the field bus 28. In order to provide the regulation algorithm, the central control apparatus 30 may have a control program module 32 which receives the observation data via a transmission device of the control apparatus 30 and generates the actuating data determined therefrom. The observation data and the actuating data together form regulation data 34 which form part of the control program module 32.

The central control apparatus 30 need not be dedicated hardware, but rather further user applications may also be provided by the central control apparatus 30. For example, the central control apparatus 30 may be a central server or a workstation computer which is arranged outside a production hall in which the installation components 12, 14, 16, 18 and the associated apparatuses 20, 22, 24, 26 are situated. In the example shown, an unauthorized person, that is to say a hacker 36, has managed to smuggle malware 38 into the control apparatus 30 and to execute the malware. The hacker 36 uses the malware 38 to read the observation data 34, for example from a main memory of the central control apparatus 30, via a data connection 40, for example an Internet connection, in order to obtain information relating to the state of the installation 10. However, in the installation 10, the hacker 36 is effectively prevented from being able to interpret the regulation data 34, let alone being able to deliberately tamper with said data.

For this purpose, the respective observation data records are encrypted by the apparatuses 20, 22, 24, 26 and are transmitted to the central control apparatus 30 only in encrypted form via the data bus 28. The regulation algorithm of the control program module 32 is adapted to the effect that it calculates the actuating data records on the basis of the encrypted observation data records without having to previously decrypt the observation data records for this purpose. The regulation data 34 are therefore continuously present only in encrypted form outside the apparatuses 20, 22, 24, 26.

Encrypted transmission via the field bus 28 would not be sufficient here since the regulation data 34 would be visible again "as plain text" at the latest in the central control apparatus 30 using the malware 38. However, in the installation 10, the regulation data are also encrypted at all times inside the central control apparatus 30, with the result that even a memory image of the central control apparatus 30 does not suffice to obtain the regulation data in a form which can be interpreted. Complete data integrity is therefore achieved, which is a considerable added value for failsafe systems.

Since not only eavesdropping but also tampering with the regulation data using malicious software 38 which runs in parallel with the controller are prevented, this method reliably protects the installation 10. Furthermore, the direct processing of the encrypted observation data records spares the computing complexity for the otherwise required encryption and decryption in the central control apparatus 30, with the result that the runtime behavior of the control apparatus 30 is not changed in comparison with processing using unencrypted regulation data.

Homomorphic encryption of the observation data can be used, for example, as suitable encryption which also allows the actuating data to be calculated on the basis of encrypted observation data. The control program module 32 of the central control apparatus 30 then processes the observation data without knowing the decryption key and therefore without being able to decrypt and interpret the observation data. In this case, the computing operations of the control program module 32 are transparent to the encryption and the result, that is to say the actuating data, is likewise present in encrypted form and can be sent to the corresponding devices again via the field bus 28. The use of continuous encryption is possible since rather simple data links are often carried out in controllers and can therefore also be combined more easily with a homomorphic encryption method than complex calculations.

For the typical operations of a controller, appropriate methods and functions for the typical calculation operations should be determined when developing the installation. Examples of these may be taken from instances where collections of suitable homomorphic functions have already been collected in connection with data mining. In addition to the data source which has already been mentioned, a further data source can be found, for example, in the following website: www.heise.de/tr/artikel/Mehr-Sicherheit-fuer-Datenwolken-1324650.html. The advantages of this type of encryption are shown, in particular, when the controller does not run on separate hardware but rather is provided as a control program module 32 alongside many other program modules on a PC or else on large computer farms. In both cases, it is necessary to effectively prevent another program from reaching the regulation data in the control program module by through weak points of the operating systems used.

The example shows how, according to the invention, the use of particular encryption methods can be used such that the regulation data for regulating operation of a process and/or production and/or actuating installation need not be decrypted outside the additional assemblies for the individual installation components, i.e., the regulation data is never present outside the individual components in a form which can he interpreted or deliberately tampered with.

What is claimed is:

1. A method for regulating at least one of a process, production, and actuating installation, the method comprising:
   recording at least one observation data record at at least one respective installation component of the installation using a respective recorder of the installation;
   transmitting each of the at least one observation data record to a central control apparatus of the installation via a field bus;
   forming, at the central control apparatus, at least one associated actuating data record in accordance with a predetermined control algorithm based on the at least one transmitted observation data record;
   transmitting respectively the at least one associated actuating data record to at least one actuator of the installation via the field bus; and
   adjusting, using the at least actuator, the at least one respective installation component of the installation based on the transmitted at least one associated actuating data record;
   wherein each respective one of the at least one observation data record to be transmitted via an encryption method unknown to the central control apparatus and in connection with the predetermined control algorithm is encrypted in the respective recorder via a useful encryption method and transmitted in encrypted form;
   wherein, when forming the at least one associated actuating data record, each of the at least one associated actuating data record is formed in the central control apparatus from the at least one encrypted observation data record without decrypting the at least one encrypted observation data record in the forming process, thereby an encrypted actuating data record is thus respectively generated and transmitted;
   wherein the respective encrypted actuating data record for actuating the associated installation component is decrypted only in each respective actuator; and
   wherein, in order to encrypt at least one of the observation data records to be transmitted, the respective recorder transmits not only true, actual observation data but additionally a further partial data record containing false observation data in a respective observation data record.

2. The method of claim 1, wherein, in order to encrypt at least one of the observation data records to be transmitted, a bit pattern is impressed on the observation data record using a bit operation and the bit pattern is removed again by an inverse bit operation in order to decrypt each associated encrypted actuating data record.

3. The method of claim 1, wherein, in order to encrypt at least one of the observation data records to be transmitted, the at least one observation data record is transformed using one of a linear transformation and an affine transformation and, in order to decrypt each associated encrypted actuating data record, the latter is transformed using an inverse transformation corresponding to the one of a linear transformation and an affine transformation.

4. The method of claim 1, wherein, in order to encrypt at least one of the observation data records to be transmitted, the at least one observation data record is encrypted using homomorphic encryption and the at least one associated actuating data record is formed in the central controller using a calculation rule adapted to the homomorphic encryption.

5. A recording and actuating apparatus for an installation component of at least one of a process, production, and actuating installation, the recording and actuating apparatus comprising:
- a recorder configured to form an observation data record describing a current state of the installation component from at least one of measurement data and state parameters in accordance with a predetermined control algorithm;
- a transmitter configured to transmit the observation data record to a central control apparatus via a field bus, and to receive an associated actuating data record from the central control apparatus via the field bus; and
- an actuator configured to deliver at least one actuating signal to an actuator of the installation component based on the actuating associated data record;
- wherein the recorder is further configured to encrypt the observation data record before transmission to the central control apparatus using an encryption method which is unknown to the central control apparatus in connection with the predetermined control algorithm via a useful encryption method;
- wherein the actuator is further configured to decrypt the actuating data record, before generating the at least one actuating signal, using a decryption method corresponding to the useful encryption method; and
- wherein, in order to encrypt at least one observation data record to be transmitted, the recorder transmits not only true, actual observation data but additionally a further partial data record containing false observation data in the observation data record.

6. A central control apparatus for regulating installation components of at least one of a process, production, and actuating installation, the central control apparatus comprising:
- a transmitter configured to receive, via an encryption method unknown to the central control apparatus, observation data records encrypted in a recorder via a useful encryption method over a field bus, and configured to transmit associated encrypted actuating data records formed in accordance with a predetermined control algorithm from the encrypted observation data records; and
- a processor configured to generate the associated encrypted actuating data records from the encrypted observation data records without decrypting the encrypted observation data records;
- wherein the encrypted actuating data records are generated using a predefined regulation algorithm which is formed from a standard regulation algorithm such that the decryption of the encrypted actuating data records yields the same result as if the encrypted observation data records had first been decrypted and the decrypted observation data records had then been processed using the standard regulation algorithm;
- wherein not only true, actual observation data but additionally a further partial data record containing false observation data in a respective observation data record are received from the recorder.

7. A computer program product having computer programs which are stored on at least one non-transitory storage medium and one of which is in the form of a central control program for a central control apparatus of at least one of a process, production, and actuating installation and at least one further one of which is in the form of an operating program for a recording and actuating apparatus of an installation component, wherein the recording and actuating apparatus is coupled to the central control apparatus via a field bus, and wherein the computer programs are together configured to implement the method of claim 1 when executed by the central control apparatus and the recording and actuating apparatus.

* * * * *